(12) United States Patent
Chae et al.

(10) Patent No.: US 12,113,194 B2
(45) Date of Patent: Oct. 8, 2024

(54) METHOD OF PRODUCING NEGATIVE ELECTRODE

(71) Applicant: LG ENERGY SOLUTION, LTD., Seoul (KR)

(72) Inventors: Oh Byong Chae, Daejeon (KR); Ye Ri Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 83 days.

(21) Appl. No.: 17/610,096

(22) PCT Filed: May 7, 2020

(86) PCT No.: PCT/KR2020/006048
§ 371 (c)(1),
(2) Date: Nov. 9, 2021

(87) PCT Pub. No.: WO2020/231087
PCT Pub. Date: Nov. 19, 2020

(65) Prior Publication Data
US 2022/0223833 A1 Jul. 14, 2022

(30) Foreign Application Priority Data
May 10, 2019 (KR) .......................... 10-2019-0055011

(51) Int. Cl.
*H01M 4/04* (2006.01)
*H01M 4/1393* (2010.01)
(Continued)

(52) U.S. Cl.
CPC ....... *H01M 4/0459* (2013.01); *H01M 4/1393* (2013.01); *H01M 4/1395* (2013.01); *H01M 4/587* (2013.01); *H01M 10/0525* (2013.01)

(58) Field of Classification Search
CPC ............. H01M 4/0459; H01M 4/1393; H01M 4/1395; H01M 4/587; H01M 10/0525;
(Continued)

(56) References Cited

U.S. PATENT DOCUMENTS 5,743,921 A 4/1998 Nazri et al.
2013/0327648 A1 12/2013 Grant et al.
(Continued)

FOREIGN PATENT DOCUMENTS

CN 104081573 A 10/2014
CN 105190958 A 12/2015
(Continued)

OTHER PUBLICATIONS

KR-20170058798-A, machine translation, originally published 2017, p. 1-10 (Year: 2017).*
(Continued)

*Primary Examiner* — Katherine A Bareford
*Assistant Examiner* — Christina D McClure
(74) *Attorney, Agent, or Firm* — Birch, Stewart, Kolasch & Birch, LLP (57) ABSTRACT

A method of producing a negative electrode, which includes: providing a negative electrode roll on which a negative electrode structure is wound, the negative electrode structure includes a negative electrode current collector and a negative electrode active material layer on at least one surface of the negative electrode current collector; providing a pre-lithiation bath containing a pre-lithiation solution, which is sequentially divided into an impregnation section, a pre-lithiation section, and an aging section; impregnating the negative electrode structure with the pre-lithiation solution while unwinding the negative electrode structure from the negative electrode roll and moving the same through the sections. The pre-lithiation is performed by disposing a
(Continued)

lithium metal counter electrode, which is spaced apart from the negative electrode structure and impregnated with the pre-lithiation solution, in the pre-lithiation section and electrochemically charging the negative electrode structure.

8 Claims, 1 Drawing Sheet

(51) Int. Cl.
  *H01M 4/1395* (2010.01)
  *H01M 4/587* (2010.01)
  *H01M 10/0525* (2010.01)
(58) Field of Classification Search
  CPC ............ H01M 10/052; H01M 4/0416; H01M 4/386; H01M 4/139; H01M 4/1391; H01M 4/364; H01M 4/483; H01M 4/1396
  See application file for complete search history.

(56) References Cited

U.S. PATENT DOCUMENTS

| | | | |
|---|---|---|---|
| 2015/0191841 A1 | 7/2015 | Grant et al. | |
| 2015/0333385 A1 | 11/2015 | Sun et al. | |
| 2016/0141596 A1 | 5/2016 | Uhm et al. | |
| 2017/0338480 A1* | 11/2017 | Kim | H01M 4/1395 |
| 2019/0109322 A1 | 4/2019 | Grant et al. | |
| 2020/0058929 A1 | 2/2020 | Chae et al. | |
| 2021/0175489 A1 | 6/2021 | Grant et al. | |
| 2022/0216459 A1* | 7/2022 | Chae | H01M 4/364 |
| 2022/0231269 A1* | 7/2022 | Chae | H01M 4/0459 |
| 2022/0352489 A1* | 11/2022 | Chae | H01M 10/058 |
| 2023/0066827 A1* | 3/2023 | Chae | H01M 4/1395 |
| 2023/0080998 A1 | 3/2023 | Grant et al. | |

FOREIGN PATENT DOCUMENTS

| | | | |
|---|---|---|---|
| CN | 106716682 A | | 5/2017 |
| CN | 109103496 A | | 12/2018 |
| JP | 9-22690 A | | 1/1997 |
| JP | 2008-16199 A | | 1/2008 |
| JP | 2008-77963 A | | 4/2008 |
| KR | 1999-0086308 A | | 12/1999 |
| KR | 10-0291067 B1 | | 6/2001 |
| KR | 10-1397415 B1 | | 5/2014 |
| KR | 10-2014-0106645 A | | 9/2014 |
| KR | 10-2015-0014676 A | | 2/2015 |
| KR | 20170058798 A | * | 5/2017 |
| KR | 10-1771122 B1 | | 9/2017 |
| WO | WO 2013/082330-1 | | 6/2013 |
| WO | WO 2019/031744 A1 | | 2/2019 |

OTHER PUBLICATIONS

CN 109103496 A, machine translation, originally published 2018, p. 1-12 (Year: 2018).*
International Search Report for PCT/KR2020/006048 mailed on Aug. 12, 2020.
Extended European Search Report for European Application No. 20806724.9, dated Aug. 1, 2022.

* cited by examiner

METHOD OF PRODUCING NEGATIVE ELECTRODE

CROSS-REFERENCE TO RELATED APPLICATION

This application claims priority to and the benefit of Korean Patent Application No. 10-2019-0055011, filed on May 10, 2019, the disclosure of which is incorporated herein by reference in its entirety.

Technical Field

The present invention relates to a method of producing a negative electrode.

Background Art

Recently, in response to the rapid spread of electronic devices using batteries, such as mobile phones, notebook computers, and electric vehicles, demand for secondary batteries having a small size, a light weight, and relatively high capacity is rapidly increasing. In particular, lithium secondary batteries have been in the spotlight as a driving power source for portable devices due to having a light weight and high energy density. Accordingly, research and development efforts for improving the performance of lithium secondary batteries have been continuously made.

The lithium secondary battery generally includes a positive electrode, a negative electrode, a separator interposed between the positive electrode and the negative electrode, an electrolyte, an organic solvent, and the like. In addition, in the positive electrode and the negative electrode, an active material layer including a positive electrode active material or a negative electrode active material may be formed on a current collector. In general, a lithium-containing metal oxide such as $LiCoO_2$, $LiMn_2O_4$, or the like is used as a positive electrode active material in the positive electrode, and a carbon-based material or a silicon-based material which does not contain lithium is used as a negative electrode active material in the negative electrode.

In the case of such a negative electrode, a passivation film such as a solid electrolyte interface layer (SEI layer) is formed on the surface of the negative electrode during initial charging. Since the passivation film interferes with the insertion of an organic solvent into the negative electrode and suppresses the decomposition reaction of an organic solvent, the aging of the negative electrode structure, and the reversibility of the negative electrode is improved, and the negative electrode structure its enables use in the negative electrode. However, the formation reaction of the passivation film, which is an irreversible reaction, leads to the consumption of lithium ions, resulting in reduced battery capacity, and as lithium ions are consumed while the battery cycle of the battery is repeated, capacity and cycle life are degraded.

Accordingly, a method of pre-lithiating a negative electrode by intercalating lithium into the negative electrode to promote the pre-formation of a passivation film on the surface of the negative electrode, the prevention of capacity degradation, and the improvement of cycle life has been developed.

As examples of the pre-lithiation method, a method of diffusing lithium into a negative electrode structure by bringing a negative electrode structure and a lithium metal into contact, a method of introducing a negative electrode structure into a lithium salt-containing solution and electrochemically charging the negative electrode structure using a lithium metal as a counter electrode, and the like are known. However, the above-described methods have difficulty in uniform pre-lithiation or formation of a passivation film because it is difficult to uniformly diffuse lithium/lithium ions in the negative electrode structure.

Korean Registered Patent No. 10-0291067 discloses a method of pre-lithiating a carbon electrode and a method of producing a lithium secondary battery using the same.

Prior-Art Documents

Patent Documents

Korean Registered Patent No. 10-0291067

DISCLOSURE

Technical Problem

The present invention is directed to providing a method of producing a negative electrode which allows pre-lithiation to be uniformly and stably performed by allowing lithium ions to be uniformly diffused in a negative electrode structure by performing an aging process after the pre-lithiation in the pre-lithiation of a negative electrode by an electrochemical charging method, resulting in improvement of lifetime characteristics of a negative electrode.

The present invention is also directed to providing a method of producing a negative electrode which is capable of improving quality consistency of a product and processability by performing pre-lithiation of a negative electrode in a roll-to-roll manner.

Technical Solution

One aspect of the present invention provides a method of producing a negative electrode, which includes: providing a negative electrode roll on which a negative electrode structure is wound, the negative electrode structure comprising a negative electrode current collector and a negative electrode active material layer on at least one surface of the negative electrode current collector; providing a pre-lithiation bath containing a pre-lithiation solution, which is sequentially divided into an impregnation section, a pre-lithiation section, and an aging section; impregnating the negative electrode structure with the pre-lithiation solution while unwinding the negative electrode structure from the negative electrode roll and moving the same through the impregnation section; pre-lithiating the negative electrode structure having passed through the impregnation section while moving the same through the pre-lithiation section; and aging the negative electrode structure having passed through the pre-lithiation section while moving the same through the aging section to form an aged negative electrode structure, wherein the pre-lithiation is performed by disposing a lithium metal counter electrode, which is spaced apart from the negative electrode structure and impregnated with the pre-lithiation solution, in the pre-lithiation section and electrochemically charging the negative electrode structure.

Advantageous Effects

A method of producing a negative electrode according to the present invention includes an aging process after pre-lithiation in the pre-lithiation of a negative electrode by an electrochemical charging method. Accordingly, it is possible to uniformly and stably diffuse lithium ions in a negative electrode structure, and thus the formation of a uniform passivation film on a negative electrode and the improvement of lifetime characteristics of a negative electrode can be promoted.

In addition, according to the method of producing a negative electrode of the present invention, a negative electrode is produced in a roll-to-roll manner, and the pre-lithiation and production of a negative electrode can be achieved by passing/moving a negative electrode structure through an impregnation section, a pre-lithiation section, and an aging section along rolls. Accordingly, processability in negative electrode production and quality consistency of a product can be improved.

MODES OF THE INVENTION

Figure 1:
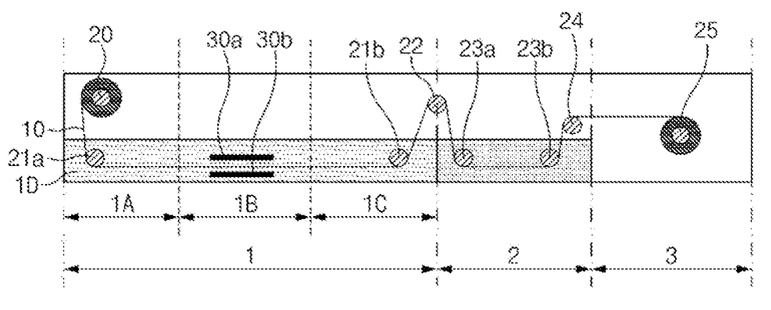
The FIGURE is a schematic diagram for describing a method of producing a negative electrode according to the present invention.

Terms and words used in this specification and the claims should not be interpreted as limited to commonly used meanings or meanings in dictionaries and should be interpreted with meanings and concepts which are consistent with the technological scope of the invention based on the principle that the inventors can appropriately define concepts of terms in order to describe the invention in the best way.

The terminology provided herein is merely used for the purpose of describing particular embodiments, and is not intended to be limiting of the present invention. The singular forms "a," "an," and "the" are intended to include the plural forms as well, unless the context clearly indicates otherwise.

It should be understood that the terms "comprising," "including," and/or "having," when used herein, specify the presence of stated features, integers, steps, operations, elements, components and/or combinations thereof, but do not preclude the presence or addition of one or more other features, integers, steps, operations, elements, components and/or combinations thereof.

In the present invention, an average particle diameter ($D_{50}$) may be defined as a particle diameter corresponding to 50% of the cumulative volume in a particle diameter distribution curve. The average particle diameter ($D_{50}$) may be measured using, for example, a laser diffraction method. The laser diffraction method generally allows the measurement of a particle diameter ranging from a submicron level to several millimeters and may produce a result having high reproducibility and high resolution.

Hereinafter, the present invention will be described in detail.

Method of Producing Negative Electrode

The present invention relates to a method of producing a negative electrode, and specifically, to a method of producing a negative electrode for a lithium secondary battery.

The method of producing a negative electrode according to the present invention includes: fabricating a negative electrode roll on which a negative electrode structure including a negative electrode current collector and a negative electrode active material layer formed on at least one surface of the negative electrode current collector is wound; fabricating a pre-lithiation bath containing a pre-lithiation solution, which is sequentially divided into an impregnation section, a pre-lithiation section, and an aging section; impregnating the negative electrode structure with the pre-lithiation solution while unwinding the negative electrode structure from the negative electrode roll and moving the same through the impregnation section; pre-lithiating the negative electrode structure having passed through the impregnation section while moving the same through the pre-lithiation section; and aging the negative electrode structure having passed through the pre-lithiation section while moving the same through the aging section, wherein the pre-lithiation is performed by disposing a lithium metal counter electrode, which is spaced apart from the negative electrode structure and impregnated with the pre-lithiation solution, in the pre-lithiation section and electrochemically charging the negative electrode structure.

Hereinafter, the method of producing a negative electrode according to the present invention will be described in detail with reference to the accompanying drawing. In giving reference numerals to components of the drawing, it should be noted that the same components have the same reference numerals as much as possible although being shown in different drawings. Further, in the description of embodiments of the present invention, a detailed description of known functions and configurations incorporated herein will be omitted to avoid making the subject matter of the present invention unclear.

The FIGURE is a schematic diagram for describing the method of producing a negative electrode.

The method of producing a negative electrode according to the present invention includes fabricating a negative electrode roll 20 on which a negative electrode structure 10 including a negative electrode current collector and a negative electrode active material layer formed on at least one surface of the negative electrode current collector is wound.

According to the method of producing a negative electrode of the present invention, a pre-lithiation process is performed by unwinding the negative electrode structure 10 from the negative electrode roll 20 on which the negative electrode structure 10 has been wound, introducing the same into a pre-lithiation bath 1 to be described below, and moving the same through the pre-lithiation bath 1. In other words, the method of producing a negative electrode according to the present invention is a method of producing a negative electrode in a roll-to-roll manner and has an advantage of improvements in processability and quality consistency of a product because electrolyte impregnation, pre-lithiation, and aging processes may be performed at one time while the negative electrode structure 10 moves.

The negative electrode structure 10 is wound on the negative electrode roll 20 and includes a negative electrode current collector and a negative electrode active material layer formed on at least one surface of the negative electrode current collector.

The negative electrode roll 20 may be used without limitation as long as it allows the negative electrode structure 10 to be wound/unwound thereon/therefrom and is typically used in a roll-to-roll process.

The negative electrode current collector is not particularly limited as long as it does not cause a chemical change in the battery and has high conductivity. Specifically, as the negative electrode current collector, copper, stainless steel, aluminum, nickel, titanium, calcined carbon, copper or stainless steel whose surface has been treated with carbon, nickel, titanium, silver, or the like, an aluminum-cadmium alloy, or the like may be used.

The negative electrode current collector may typically have a thickness of 3 to 500 μm.

The negative electrode current collector may have fine irregularities formed on a surface thereof to increase the adhesion of a negative electrode active material. In addition, the negative electrode current collector may be used in any of various forms such as a film, a sheet, a foil, a net, a porous material, a foam, a non-woven fabric, and the like.

The negative electrode active material layer is formed on at least one surface of the negative electrode current collector. Specifically, the negative electrode active material layer may be formed on one surface or both surfaces of the negative electrode current collector and is preferably formed on both surfaces of the negative electrode current collector in view of the utilization of the negative electrode active material and the improvement of cell energy density.

The negative electrode active material layer includes a negative electrode active material.

The negative electrode active material may include at least one selected from the group consisting of a carbon-based active material and a silicon-based active material.

The silicon-based active material may impart excellent capacity characteristics and excellent durability to the negative electrode or the secondary battery of the present invention.

The silicon-based active material may include a compound represented by $SiO_x$ (0≤x<2). Since Sift does not react with lithium ions, it is not possible to store lithium. Therefore, it is preferable that x is within the above-described range, and the silicon-based oxide is more preferably SiO.

The silicon-based active material may have an average particle diameter ($D_{50}$) of 1 μm to 30 μm, and preferably, 3 μm to 15 μm in view of ensuring structural stability and reducing side reactions with an electrolyte during charging and discharging.

The carbon-based active material may impart excellent cycle characteristics or excellent battery lifetime characteristics to the negative electrode or the secondary battery of the present invention.

Specifically, the carbon-based active material may include at least one selected from the group consisting of artificial graphite, natural graphite, hard carbon, soft carbon, carbon black, acetylene black, Ketjen black, Super P, graphene, and fibrous carbon and preferably includes at least one selected from the group consisting of artificial graphite and natural graphite.

The carbon-based active material may have an average particle diameter ($D_{50}$) of 10 μm to 30 μm, and preferably, 15 μm to 25 μm in view of ensuring structural stability and reducing side reactions with an electrolyte during charging and discharging.

Specifically, the negative electrode active material preferably includes both the silicon-based active material and the carbon-based active material in view of improving both capacity characteristics and cycle characteristics. More specifically, the negative electrode active material preferably includes the carbon-based active material and the silicon-based active material in a weight ratio of 50:50 to 95:5, and more preferably, in a weight ratio of 60:40 to 80:20. It is preferable that the weight ratio of the carbon-based active material and the silicon-based active material is within the above-described range in view of improving both capacity characteristics and cycle characteristics.

The negative electrode active material may be included at 60 wt % to 99 wt %, and preferably, 75 wt % to 95 wt % with respect to the total weight of the negative electrode active material layer in the negative electrode active material layer.

The negative electrode active material layer may further include a binder and/or a conductive material in addition to the negative electrode active material.

The negative electrode active material layer may further include a binder and/or a conductive material in addition to the negative electrode active material.

The binder is used to improve adhesion between the negative electrode active material layer and the negative electrode current collector to accordingly improve battery performance. The binder may include, for example, at least one selected from the group consisting of a polyvinylidene fluoride-hexafluoropropylene copolymer (PVDF-co-HFP), polyvinylidene fluoride (PVDF), polyacrylonitrile, polymethyl methacrylate, polyvinyl alcohol, carboxymethylcellulose (CMC), starch, hydroxypropylcellulose, regenerated cellulose, polyvinylpyrrolidone, polytetrafluoroethylene, polyethylene, polypropylene, polyacrylic acid, an ethylene-propylene-diene monomer (EPDM), a sulfonated EPDM, styrene butadiene rubber (SBR), fluorine rubber, polymers in which hydrogens thereof have been substituted with Li, Na, Ca, or the like, and various copolymers thereof.

The binder may be included at 0.5 wt % to 10 wt %, and preferably, 1 wt % to 5 wt % with respect to the total weight of the negative electrode active material layer in the negative electrode active material layer.

The conductive material is not particularly limited as long as it does not cause a chemical change in the produced battery and has conductivity. As the conductive material, graphite such as natural graphite, artificial graphite, or the like; carbon black such as carbon black, acetylene black, Ketjen black, channel black, furnace black, lamp black, thermal black, or the like; a conductive fiber such as carbon fibers, metal fibers, or the like; a conductive tube such as carbon nanotubes or the like; fluorocarbon powder; a metal powder such as aluminum powder, nickel powder, or the like; a conductive whisker consisting of zinc oxide, potassium titanate, or the like; a conductive metal oxide such as titanium oxide or the like; or a conductive material such as a polyphenylene derivative or the like may be used.

The conductive material may be included at 0.5 wt % to 10 wt %, and preferably, 1 wt % to 5 wt % with respect to the total weight of the negative electrode active material layer in the negative electrode active material layer.

The negative electrode active material layer may have a thickness of 10 μm to 100 μm, and preferably, 50 μm to 80 μm.

The method of producing a negative electrode according to the present invention shown in the FIGURE includes fabricating a pre-lithiation bath 1 which is sequentially divided into an impregnation section 1A, a pre-lithiation section 1B, and an aging section 1C and contains a pre-lithiation solution 1D.

The pre-lithiation bath 1 may be provided as a place where the negative electrode structure 10 unwound from the negative electrode roll 20 may be impregnated with an electrolyte, pre-lithiated, and aged while moving in the pre-lithiation bath.

The size and shape of the pre-lithiation bath 1 may be appropriately designed in consideration of the degrees of the impregnation, pre-lithiation, and aging of the negative electrode structure, the movement distance of the negative electrode structure according to roll-to-roll processing, or the like. Specifically, the ratio of lengths of the impregnation section 1A, the pre-lithiation section 1B, and the aging section 1C is 1 to 10:1:0.5 to 21, and preferably, 2 to 5:1:1.8 to 10 for smoothly performing pre-lithiation.

The pre-lithiation bath 1 contains the pre-lithiation solution 1D. The pre-lithiation bath 1 is at least partially filled with the pre-lithiation solution 1D, and the negative electrode structure 10 unwound from the negative electrode roll 20 is introduced into the pre-lithiation solution 1D and moves through the sections of the pre-lithiation bath 1.

The pre-lithiation solution 1D may include a lithium salt and an organic solvent.

The organic solvent is not particularly limited as long as it may serve as a medium through which ions involved in an electrochemical reaction can migrate. Specifically, as the organic solvent, an ester-based solvent such as methyl acetate, ethyl acetate, γ-butyrolactone, ε-caprolactone, or the like; an ether-based solvent such as dibutyl ether, tetrahydrofuran, or the like; a ketone-based solvent such as cyclohexanone or the like; an aromatic hydrocarbon-based solvent such as benzene, fluorobenzene, or the like; a carbonate-based solvent such as dimethyl carbonate (DMC), diethyl carbonate (DEC), ethyl methyl carbonate (EMC), ethylene carbonate (EC), propylene carbonate (PC), or the like; an alcohol-based solvent such as ethyl alcohol, isopropyl alcohol, or the like; a nitrile such as R—CN (R is a C2-C20 hydrocarbon group with a linear, branched or cyclic structure and may include a double-bonded aromatic ring or an ether linkage) or the like; an amide such as dimethylformamide or the like; dioxolane such as 1,3-dioxolane or the like; or sulfolane may be used. Among those listed above, a carbonate-based solvent is preferred, and EMC, EC, or the like is more preferred in view of improving electrochemical stability.

The lithium salt may include at least one selected from the group consisting of $LiPF_6$, $LiClO_4$, $LiAsF_6$, $LiBF_4$, $LiSbF_6$, $LiAlO_4$, $LiICl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$. LiCl, LiI, and $LiB(C_2O_4)_2$ and preferably includes $LiPF_6$.

A concentration of the lithium salt may range from 0.1 M to 3 M, and preferably, 0.5 M to 1.5 M based on the pre-lithiation solution, and it is preferable that the concentration of the lithium salt is within the above-described range so that the lithium salt can be sufficiently dissolved so that lithium ions can be smoothly intercalated into the active material.

In view of stabilizing the surface of the negative electrode active material to smoothly perform pre-lithiation, the pre-lithiation solution 1D may further include at least one additive selected from the group consisting of fluoroethylene carbonate (FEC), vinylene carbonate (VC), polystyrene (PS), succinonitrile, ethylene glycol bis(propionitrile) ether, and lithium bis(fluorosulfonyl)imide (LiFSI) and preferably further includes FEC.

The additive may be included at 0.1 wt % to 15 wt %, and preferably, 0.5 wt % to 5 wt % with respect to the total weight of the pre-lithiation solution in the pre-lithiation solution in view of stabilizing the surface of the negative electrode active material to smoothly perform pre-lithiation.

The pre-lithiation bath 1 is sequentially divided into the impregnation section 1A, the pre-lithiation section 1B, and the aging section 1C. The impregnation section 1A, the pre-lithiation section 1B, and the aging section 1C are not partitioned in a closed manner in the pre-lithiation bath 1 but abstractly partitioned according to the position of the negative electrode structure in the pre-lithiation bath and the process performed at the position of the negative electrode structure. For example, as shown in the FIGURE, the impregnation section 1A, the pre-lithiation section 1B, and the aging section 1C are abstractly partitioned through a dotted line in the pre-lithiation bath 1.

As the pre-lithiation bath 1 contains the pre-lithiation solution 1D, the pre-lithiation solution 1D is also contained in the impregnation section 1A, the pre-lithiation section 1B, and the aging section 1C which are partitioned in the pre-lithiation bath 1.

In the impregnation section 1A, the pre-lithiation section 1B, and the aging section 1C, one or more fixed rolls 21a, 21b may be disposed so that the negative electrode structure 10 unwound from the negative electrode roll 20 may smoothly move through the individual sections 1A, 1B, 1C. The fixed rolls 21a, 21b are fixedly disposed in the pre-lithiation bath 1, and the unwound negative electrode structure 10 may move through the individual sections in the pre-lithiation bath 1 along the fixed rolls 21a, 21b. Specifically, as shown in the FIGURE, one or more fixed rolls 21a, 21b may be disposed at both ends of the pre-lithiation bath 1.

The size or length of the impregnation section 1A, the pre-lithiation section 1B, and the aging section 1C may be appropriately designed in consideration of the degrees of electrolyte impregnation, pre-lithiation, and aging of the negative electrode structure 10.

A temperature of the pre-lithiation bath 1 or the pre-lithiation solution 1D may range from 10° C. to 80° C., preferably 20° C. to 60° C., and more preferably 25° C. to 40° C. When the temperature thereof is within the above-described range, the pre-lithiation of a negative electrode and the diffusion of lithium ions into the negative electrode structure can smoothly proceed.

The method of producing a negative electrode according to the present invention includes impregnating the negative electrode structure 10 with the pre-lithiation solution 1D while unwinding the negative electrode structure 10 from the negative electrode roll 20 and moving the same through the impregnation section 1A.

The negative electrode structure 10 unwound from the negative electrode roll 20 is introduced into the pre-lithiation bath 1 and moves through the impregnation section 1A. Specifically, as shown in the FIGURE, the negative electrode structure 10 unwound from the negative electrode roll 20 may move through the impregnation section 1A along the fixed rolls 21a, 21b.

As the negative electrode structure 10 moves through the impregnation section 1A, electrolyte impregnation is achieved by the pre-lithiation solution 1D contained in the impregnation section 1A. Due to the electrolyte impregnation, lithium ions may be more smoothly intercalated in the pre-lithiation of the negative electrode structure 10.

The time taken for the negative electrode structure 10 to move through the impregnation section 1A is 1 times to 10 times, more preferably, 1.5 times to 5 times the time taken for the negative electrode structure 10 to move through the pre-lithiation section 1B to be described below. When the time is within the above-described range, it is possible to form a more uniform passivation film in pre-lithiation to be described below and perform pre-lithiation.

The method of producing a negative electrode according to the present invention includes pre-lithiating the negative electrode structure 10 having passed through the impregnation section 1A while moving the same through the pre-lithiation section 1B.

The negative electrode structure 10 passes through the impregnation section 1A and enters the pre-lithiation section 1B. In the pre-lithiation section 1B, the negative electrode structure 10 is pre-lithiated, and lithium ions are intercalated into the negative electrode active material layer or negative electrode active material. Accordingly, the irreversible capacity of the negative electrode active material is removed, and a passivation film is formed.

The pre-lithiation is performed while the negative electrode structure 10 moves through the pre-lithiation section 1B.

The time taken for the negative electrode structure 10 to move through the pre-lithiation section 1B may range from 5 minutes to 120 minutes, preferably 10 minutes to 90 minutes, and more preferably 15 minutes to 40 minutes. It is preferable that the time is within the above-described range so that it is possible to more uniformly pre-lithiate the negative electrode active material and prevent an increase in by-products in a negative electrode due to excessive pre-lithiation.

The pre-lithiation is performed by disposing lithium metal counter electrodes 30a, 30b, which are spaced apart from the negative electrode structure 10 and impregnated with the pre-lithiation solution 1D, in the pre-lithiation section 1B and electrochemically charging the negative electrode structure 10.

When a conventional pre-lithiation method, in which a lithium metal and a negative electrode structure are in direct contact, is applied in a roll-to-roll process, both a negative electrode structure and a lithium metal need to be wound on a negative electrode roll. In this case, it is not possible to adjust an intercalation rate of lithium ions in the electrolyte impregnation or aging process, and thus a negative electrode active material may be damaged, causing the lifetime characteristics of the negative electrode active material to be degraded. When a process of contacting a lithium metal with a negative electrode structure and compressing them is separately performed without winding both a negative electrode structure and a lithium metal on a negative electrode roll, it is not possible to perform electrolyte impregnation, pre-lithiation, and aging processes at one time as in the present invention, and thus there is high inconvenience in the process.

However, the method of producing a negative electrode according to the present invention makes it possible to adjust an intercalation rate of lithium ions and prevent volume expansion of or damage to a negative electrode active material due to excessive lithium intercalation by performing pre-lithiation by an electrochemical charging method using a lithium metal spaced apart from the negative electrode structure as a counter electrode, as compared with the conventional method in which a negative electrode structure and a lithium metal are in direct contact.

The electrochemical charging may be performed by an oxidation-reduction reaction using an electrochemical charging/discharging device.

The lithium metal counter electrodes 30a, 30b may function as a counter electrode for the negative electrode structure 10. The lithium metal counter electrodes 30a, 30b are spaced apart from the negative electrode structure 10 in the pre-lithiation bath 1 to prevent an electrical short circuit with the negative electrode structure 10 during the electrochemical charging.

The pre-lithiation may be performed at a current density of 0.2 mA/cm$^2$ to 10 mA/cm$^2$, and preferably, 2 mA/cm$^2$ to 6 mA/cm$^2$. When the electrochemical charging is performed at a current density within the above-described range, the negative electrode active material can be stably and uniformly pre-lithiated.

The pre-lithiation may be performed by electrochemical charging to 5 to 50%, preferably, 15 to 35% of the state of charge (SoC) of the negative electrode structure. It is preferable that the pre-lithiation is performed by electrochemical charging to the above-described range so that a passivation film can be uniformly and stably formed on the surface of the negative electrode structure, and thus the reversible capacity of a battery can be improved, resulting in improvement of cycle characteristics of the battery.

The method of producing a negative electrode according to the present invention includes aging the negative electrode structure 10 having passed through the pre-lithiation section 1B while moving the same through the aging section 1C.

After the negative electrode structure 10 passes through the pre-lithiation section 1B, the negative electrode structure enters the aging section 1C.

As the pre-lithiated negative electrode structure moves through the aging section 1C containing the pre-lithiation solution 1D, lithium ions intercalated by the pre-lithiation may be more uniformly diffused on the surface and in the inside of the negative electrode active material. When the aging process is not performed after the pre-lithiation, lithium ions are not uniformly diffused into the negative electrode active material, and thus it may be difficult to sufficiently remove the irreversible capacity even though the pre-lithiation has been performed, and charging and discharging may not uniformly occur after a negative electrode is produced.

The time taken for the negative electrode structure 10 to move through the aging section 1C is 0.5 times to 21 times, preferably, 1.8 times to 10 times the time taken for the negative electrode structure 10 to move through the pre-lithiation section 1B. It is preferable that the time is within the above-described range so that lithium ions can be more uniformly diffused in the negative electrode active material, and detachment of the negative electrode active material layer from the current collector due to excessive aging or an increase in resistance due to an increase in thickness of a surface coating of a negative electrode can be prevented.

The method of producing a negative electrode according to the present invention may further include washing the aged negative electrode structure 10 by removing the aged negative electrode structure 10 from the pre-lithiation bath 1, introducing the negative electrode structure into a washing bath 2 containing an organic solvent, and moving the negative electrode structure through the washing bath 2.

Since the method of producing a negative electrode according to the present invention further includes the washing process after the pre-lithiation and aging of the negative electrode structure 10, impurities remaining in the negative electrode structure may be removed.

The washing process may be performed by taking the aged negative electrode structure 10 out of the pre-lithiation bath 1 and introducing the same into the separately arranged washing bath 2.

The washing process may be performed by discharging the aged negative electrode structure 10 from the pre-lithiation bath 1 and introducing the same into the washing bath 2 through a fixed roll 22 disposed between the pre-lithiation bath 1 and the washing bath 2, and the aged negative electrode structure 10 may be washed while moving through the washing bath 2. The movement of the negative electrode structure 10 through the washing bath 2 may proceed by separately arranged fixed rolls 23a, 23b.

The washing bath 2 contains the organic solvent, specifically, the organic solvent not containing a lithium salt. The aged negative electrode structure is washed while moving in the solution not containing a lithium salt. As the organic solvent, the organic solvent listed in the description of the pre-lithiation solution may be used.

The time taken for the aged negative electrode structure 10 to move through the washing bath 2 is 0.1 times to 5 times, more preferably, 0.5 times to 2 times the time taken for the negative electrode structure 10 to move through the pre-lithiation section 1B. When the time is within the above-described range, impurities remaining in the negative electrode structure can be smoothly removed.

The method of producing a negative electrode according to the present invention may further include drying the washed negative electrode structure 10.

Through the drying process, the organic solvent remaining in the negative electrode structure after the impregnation, pre-lithiation, aging, and/or washing processes may be removed.

Specifically, the drying process may be performed by taking the washed negative electrode structure 10 out of the washing bath 2, introducing the same into a separately arranged drying part 3, and moving the same through the drying part 3. A fixed roll 24 may be disposed between the washing bath 2 and the drying part 3, and the negative electrode structure 10 may move along the fixed roll 24.

The drying process may be performed by air or an inert gas. The inert gas may be at least one selected from the group consisting of Ar, $N_2$, and He.

The drying process may be performed at 10° C. to 80° C., preferably 20° C. to 60° C., and more preferably 25° C. to 40° C. It is preferable that the drying process is performed at a temperature within the above-described range so that the negative electrode structure can be prevented from being oxidized and maintained in the pre-lithiated state.

The time taken to dry the washed negative electrode structure 10 may be 0.1 times to 5 times, and preferably, 0.5 times to 2 times the time taken for the negative electrode structure 10 to move through the pre-lithiation section. It is preferable that the time is within the above-described range so that the organic solvent remaining in the negative electrode structure can be smoothly removed, and damage to the negative electrode structure which may be caused by the organic solvent remaining in the negative electrode structure for a long time can be prevented. In the drying part 3, a collecting roll 25 may be installed, and the negative electrode structure 10 that has moved through the drying part 3 may be wound on the collecting roll 25.

The method of producing a negative electrode according to the present invention may further include producing a negative electrode by unwinding the negative electrode structure 10 from the collecting roll 25 and cutting the same.

The negative electrode may be assembled with a positive electrode, a separator, an electrolyte, and the like as described below, and accordingly, a secondary battery, specifically a lithium secondary battery, may be produced.

The negative electrode produced by the above-described method has improved reversibility and improved initial efficiency due to the pre-lithiation and aging processes. Accordingly, the negative electrode produced by the method of the present invention is preferably applied to a secondary battery, specifically, a lithium secondary battery.

In addition, according to the above-described production method, since the electrolyte impregnation, pre-lithiation, aging, additional washing, and/or additional drying processes of the negative electrode structure may be performed at one time in a roll-to-roll manner, processability in the production of the negative electrode can be improved, and quality consistency can also be improved to a superior level.

The secondary battery may include the negative electrode produced by the above-described method, a positive electrode disposed to face the negative electrode, a separator interposed between the negative electrode and the positive electrode, and an electrolyte. Details of the negative electrode have been described above, and the positive electrode, separator, and electrolyte may be used without limitation as long as they are typically used in a lithium secondary battery.

The secondary battery is useful in the field of portable devices, such as mobile phones, notebook computers, digital cameras, and the like, and electric vehicles such as hybrid electric vehicles (HEVs).

In addition, the secondary battery may be applied to a battery module including the secondary battery as a unit cell or a battery pack including the battery module.

The battery module or battery pack may be used as a power source of one or more medium-to-large-sized devices selected from a power tool; electric vehicles (EVs), hybrid electric vehicles, and plug-in hybrid electric vehicles (PHEVs); and a system for storing electric power.

Hereinafter, the present invention will be described in detail with reference to Examples so that those skilled in the art can easily carry out the present invention. However, the present invention may be embodied in several different forms, and therefore, is not limited to Examples described herein.

EXAMPLES

Example 1: Production of Negative Electrode

<Fabrication of Negative Electrode Structure>

A negative electrode active material was prepared by mixing natural graphite (average particle diameter ($D_{50}$): 20 μm) and SiO (average particle diameter ($D_{50}$): 5 μm) in a weight ratio of 70:30.

The negative electrode active material, Denka black as a conductive material, styrene butadiene rubber (SBR) as a binder, and carboxymethylcellulose (CMC) as a thickener were mixed in a weight ratio of 92:3:3.5:1, thereby preparing a negative electrode slurry.

The negative electrode slurry was applied onto both surfaces of a copper current collector (thickness: 8 μm), and the resulting copper current collector was roll-pressed and dried in a 130° C. vacuum oven for 12 hours to form a negative electrode active material layer (thickness: 70 μm) on both surfaces of the copper negative electrode current collector, thereby fabricating a negative electrode structure.

The negative electrode structure was wound on a negative electrode roll made of stainless steel and having a diameter of 3 inches.

<Fabrication of Pre-Lithiation Bath>

A pre-lithiation bath made of stainless steel and having a width, length, and height of 100 cm×20 cm×50 cm was provided. A pre-lithiation solution was added to the pre-lithiation bath so that the pre-lithiation solution was filled to 20% of the height of the pre-lithiation bath. The pre-lithiation bath was maintained at a temperature of 25° C.

The pre-lithiation solution was prepared by adding $LiPF_6$ as a lithium salt at a concentration of 1 M to an organic solvent in which ethylene carbonate (EC) and ethyl methyl carbonate (EMC) were mixed in a volume ratio of 30:70 and adding fluoroethylene carbonate (FEC) as an additive at 2 wt % with respect to the total weight of the pre-lithiation solution.

The pre-lithiation bath was divided into an impregnation section, a pre-lithiation section, and an aging section. In the impregnation section, the pre-lithiation section, and the aging section, a plurality of fixed rolls were installed for smooth movement of the negative electrode structure.

In the pre-lithiation section, lithium metal counter electrodes were installed to be spaced apart from the movement path of the negative electrode structure. In addition, the impregnation section, pre-lithiation section, and aging section in the pre-lithiation bath were partitioned in a length ratio of 2:1:2.

<Pre-Lithiation>

The negative electrode structure was introduced into and moved through the pre-lithiation bath at a speed of 1 cm/min while being unwound from the negative electrode roll.

The unwound negative electrode structure entered the impregnation section and was moved therethrough for 40 minutes, thereby impregnating the negative electrode structure with an electrolyte solution.

The negative electrode structure having passed through the impregnation section entered the pre-lithiation section and was moved therethrough for 20 minutes, thereby pre-lithiating the negative electrode structure. Specifically, the negative electrode structure was pre-lithiated by electrochemically charging the negative electrode structure and the lithium metal counter electrodes spaced apart from the negative electrode structure to 18.5% SoC of the negative electrode structure at a current density of 4.68 mA/cm$^2$ using an electrochemical charging/discharging device (WBCS3000 manufactured by WonATech).

The negative electrode structure having passed through the pre-lithiation section entered the aging section and was moved therethrough for 40 minutes, thereby aging the negative electrode structure.

<Washing and Drying>

A washing bath made of stainless steel and having a width, length, and height of 20 cm×20 cm×50 cm was provided. A fixed roll was installed between the pre-lithiation bath and the washing bath. The washing bath contained dimethyl carbonate (DMC) as an organic solvent so that DMC was filled to 20% of the height of the washing bath.

The aged negative electrode structure was taken out of the pre-lithiation bath along the fixed roll and introduced into and moved through the washing bath.

The time taken for the negative electrode structure to move through the washing bath was 20 minutes.

A drying part made of stainless steel and having a width, length, and height of 20 cm×20 cm×50 cm was provided. A temperature of the drying part was 25° C., and the drying part was filled with air. A fixed roll was installed between the washing bath and the drying part. A collecting roll was installed in the drying part.

The washed negative electrode structure was introduced into the drying part along the fixed roll, and the time taken for the negative electrode structure to move through the drying part was 20 minutes.

The negative electrode structure that had moved through the drying part was wound on the collecting roll.

Example 2: Production of Negative Electrode

A negative electrode of Example 2 was produced in the same manner as in Example 1 except that a pre-lithiation bath having a width, length, and height of 90 cm×20 cm×50 cm was used, the impregnation section, pre-lithiation section, and aging section were partitioned in a length ratio of 2:1:1.5, and the negative electrode structure was moved through the aging section for 30 minutes.

Example 3: Production of Negative Electrode

A negative electrode of Example 3 was produced in the same manner as in Example 1 except that a pre-lithiation bath having a width, length, and height of 280 cm×20 cm×50 cm was used, the impregnation section, pre-lithiation section, and aging section were partitioned in a length ratio of 2:1:11, and the negative electrode structure was moved through the aging section for 220 minutes.

Example 4: Production of Negative Electrode

A negative electrode of Example 4 was produced in the same manner as in Example 1 except that a pre-lithiation bath having a width, length, and height of 70 cm×20 cm×50 cm was used, the impregnation section, pre-lithiation section, and aging section were partitioned in a length ratio of 2:1:0.5, and the negative electrode structure was moved through the aging section for 10 minutes.

Example 5: Production of Negative Electrode

A negative electrode of Example 5 was produced in the same manner as in Example 1 except that a pre-lithiation bath having a width, length, and height of 480 cm×20 cm×50 cm was used, the impregnation section, pre-lithiation section, and aging section were partitioned in a length ratio of 2:1:21, and the negative electrode structure was moved through the aging section for 420 minutes.

COMPARATIVE EXAMPLES

Comparative Example 1: Production of Negative Electrode

A negative electrode roll on which the negative electrode structure fabricated in Example 1 had been wound was provided.

The negative electrode structure was unwound from the negative electrode roll, a lithium metal powder was applied onto a negative electrode active material layer in the negative electrode structure in an amount of 0.4 mg/cm$^2$, and the resulting negative electrode structure was compressed.

The negative electrode structure to which the lithium metal powder had been applied was introduced into a pre-lithiation bath made of stainless steel and having a width, length, and height of 40 cm×20 cm×50 cm. The pre-lithiation solution of Example 1 was added to the pre-lithiation bath so that the pre-lithiation solution was filled to 20% of the height of the pre-lithiation bath. Fixed rolls were installed in the pre-lithiation bath, and the negative electrode structure was moved through the pre-lithiation bath at a speed of 1 cm/min for 40 minutes, thereby pre-lithiating and aging the negative electrode structure.

The negative electrode structure having undergone the pre-lithiation and aging was taken out of the pre-lithiation bath, moved through the washing bath and drying part of Example 1 in the same manner as in Example 1, and wound on a collecting roll, thereby producing a negative electrode of Comparative Example 1.

Comparative Example 2: Production of Negative Electrode

A negative electrode of Comparative Example 2 was produced in the same manner as in Example 1 except that a pre-lithiation bath having a width, length, and height of 60 cm×20 cm×50 cm was used, an aging section was not provided in the pre-lithiation bath, the negative electrode structure was not aged, and the impregnation section and pre-lithiation section were partitioned in a length ratio of 2:1.

Experimental Example 1: Evaluation of Capacity Retention Rate

<Production of Lithium Secondary Battery>

The negative electrodes produced in Examples 1 to 5 and Comparative Examples 1 and 2 were cut into a size of 3 cm×4 cm.

$LiNi_{0.8}Co_{0.1}Mn_{0.1}O_2$ as a positive electrode active material, Super C as a conductive material, and polyvinylidene fluoride (PVDF) as a binder were mixed in a weight ratio of 97:1.5:1.5 to prepare a positive electrode slurry, the positive electrode slurry was applied onto an aluminum current collector, and the resulting aluminum current collector was roll-pressed and dried at 130° C., thereby producing a positive electrode.

A polypropylene separator was interposed between the negative electrode according to each of Examples 1 to 5 and Comparative Examples 1 and 2 and the above-produced positive electrode, and an electrolyte was injected, thereby producing a lithium secondary battery. The electrolyte was prepared by adding $LiPF_6$ as a lithium salt at a concentration of 1 M to an organic solvent in which EC and EMC were mixed in a volume ratio of 30:70 and adding FEC as an additive at 2 wt % with respect to the total weight of the pre-lithiation solution.

<Evaluation of Capacity Retention Rate>

The discharge capacity and capacity retention rate of the lithium secondary batteries according to Examples 1 to 5 and Comparative Examples 1 and 2 were evaluated using an electrochemical charging/discharging device. In this case, the lithium secondary batteries were charged while applying current at a current density of 0.1 C-rate up to 4.2 V and discharged at the same current density up to 2.5 V.

The capacity retention rate was evaluated by measuring the discharge capacities of the lithium secondary batteries according to Examples 1 to 5 and Comparative Examples 1 and 2 at $1^{st}$ and $100^{th}$ cycles and substituting the resulting values into the following Equation 1, and results thereof are shown in the Table 1 below.

Capacity retention rate (%) = [Equation 1]

(Discharge capacity at $100^{th}$ cycle)/

(Discharge capacity at $1^{st}$ cycle) × 100

TABLE 1

| | Capacity retention rate (%) @ $100^{th}$ cycle |
|---|---|
| Example 1 | 94 |
| Example 2 | 92 |
| Example 3 | 90 |
| Example 4 | 87 |
| Example 5 | 86 |

TABLE 1-continued

| | Capacity retention rate (%) @ $100^{th}$ cycle |
|---|---|
| Comparative Example 1 | 79 |
| Comparative Example 2 | 82 |

Referring to Table 1, it can be seen that the negative electrodes of Examples 1 to 5 were able to be smoothly pre-lithiated and aged and also uniformly pre-lithiated, and thus excellent lifetime characteristics were exhibited.

However, it can be seen that the negative electrode of Comparative Example 1 not only had inconvenience in the process by performing pre-lithiation using a lithium metal compression method rather than an electrochemical charging method but also was not sufficiently pre-lithiated and aged, and thus lifetime characteristics were significantly degraded. In addition, it can be seen that the negative electrode of Comparative Example 2 was not aged, and thus lifetime characteristics were significantly degraded.

[List of Reference Numerals]

| | |
|---|---|
| 1: pre-lithiation bath | 1A: impregnation section |
| 1B: pre-lithiation section | 1C: aging section |
| 1D: pre-lithiation solution | 2: washing bath |
| 2A: organic solvent | 3: drying part |
| 10: negative electrode structure | 20: negative electrode roll |
| 21a, 21b, 22, 23a, 23b, 24: fixed roll | |
| 25: collecting roll | 30a, 30b: lithium metal counter electrode |

The invention claimed is:

1. A method of producing a negative electrode, comprising:
   providing a negative electrode roll on which a negative electrode structure is wound, the negative electrode structure comprises a negative electrode current collector and a negative electrode active material layer on at least one surface of the negative electrode current collector;
   providing a pre-lithiation bath comprising a pre-lithiation solution, which is sequentially divided into an impregnation section, a pre-lithiation section, and an aging section;
   impregnating the negative electrode structure with the pre-lithiation solution while unwinding the negative electrode structure from the negative electrode roll and moving the negative electrode structure through the impregnation section;
   pre-lithiating the negative electrode structure having passed through the impregnation section while moving the negative electrode structure through the pre-lithiation section; and
   aging the negative electrode structure having passed through the pre-lithiation section while moving the negative electrode structure through the aging section,
   wherein the pre-lithiation is performed by disposing a lithium metal counter electrode, which is spaced apart from the negative electrode structure and impregnated with the pre-lithiation solution, in the pre-lithiation section and electrochemically charging the negative electrode structure,
   wherein the electrochemically charging is performed by an oxidation-reduction reaction using an electrochemical charging/discharging device, wherein a time for the negative electrode structure to move through the impregnation section is 1 times to 10 times a time for the negative electrode structure to move through the pre-lithiation section, wherein a time for the negative electrode structure to move through the aging section is 0.5 times to 21 times a time for the negative electrode structure to move through the pre-lithiation section, wherein a ratio of lengths of the impregnation section, the pre-lithiation section, and the aging section ranges from 1 to 10:1:0.5 to 21, wherein the negative electrode active material layer comprises a negative electrode active material, and the negative electrode active material comprises a carbon-based active material and a silicon-based active material in a weight ratio of 60:40 to 95:5, and the negative electrode structure is moved directly from the impregnation section to the pre-lithiation section in the pre-lithiation solution, and then the negative electrode structure is moved directly from the pre-lithiation section to the aging section in the pre-lithiation solution.

2. The method of claim 1, wherein a time for the negative electrode structure to move through the pre-lithiation section ranges from 5 minutes to 120 minutes.

3. The method of claim 1, wherein a temperature of the pre-lithiation bath ranges from 10° C. to 80° C.

4. The method of claim 1, further comprising washing the aged negative electrode structure by removing the aged negative electrode structure from the pre-lithiation bath, introducing the negative electrode structure into a washing bath comprising an organic solvent, and moving the negative electrode structure through the washing bath.

5. The method of claim 4, wherein a time for the aged negative electrode structure to move through the washing bath is 0.1 times to 5 times a time for the negative electrode structure to move through the pre-lithiation section.

6. The method of claim 4, further comprising drying the washed negative electrode structure.

7. The method of claim 6, wherein a time to dry the washed negative electrode structure is 0.1 times to 5 times a time for the negative electrode structure to move through the pre-lithiation section.

8. The method of claim 1, wherein a time for the negative electrode structure to move through the aging section is 1.5 times to 11 times a time for the negative electrode structure to move through the pre-lithiation section, and wherein a ratio of lengths of the impregnation section, the pre-lithiation section, and the aging section ranges from 1 to 10:1:1.5 to 11.

* * * * *